(12) United States Patent
Lin et al.

(10) Patent No.: US 12,074,890 B2
(45) Date of Patent: *Aug. 27, 2024

(54) NETWORK THREAT PREVENTION

(71) Applicant: Rapid7, Inc., Boston, MA (US)

(72) Inventors: Wah-Kwan Lin, Melrose, MA (US); Paul Deardorff, San Francisco, CA (US)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,740

(22) Filed: Jan. 17, 2023

(65) Prior Publication Data

US 2023/0156021 A1  May 18, 2023

Related U.S. Application Data

(63) Continuation of application No. 16/723,102, filed on Dec. 20, 2019, now Pat. No. 11,588,826.

(51) Int. Cl.
*H04L 9/40* (2022.01)
*H04L 61/3015* (2022.01)

(52) U.S. Cl.
CPC ...... *H04L 63/1416* (2013.01); *H04L 63/1491* (2013.01); *H04L 61/3015* (2013.01); *H04L 63/1483* (2013.01)

(58) Field of Classification Search
CPC ............ H04L 63/1416; H04L 63/1491; H04L 61/3015; H04L 63/1483; H04L 9/40
See application file for complete search history.

(56) References Cited

U.S. PATENT DOCUMENTS

| 8,578,481 | B2 | 11/2013 | Rowley | |
|---|---|---|---|---|
| 2008/0082662 | A1 | 4/2008 | Dandliker et al. | |
| 2010/0154055 | A1 | 6/2010 | Hansen | |
| 2011/0276716 | A1* | 11/2011 | Coulson | H04L 61/4511 709/238 |
| 2016/0044054 | A1* | 2/2016 | Stiansen | H04L 63/1416 726/24 |
| 2016/0381056 | A1* | 12/2016 | Floering | G06F 16/23 726/23 |
| 2020/0053111 | A1* | 2/2020 | Jakobsson | H04L 63/1416 |
| 2020/0053119 | A1 | 2/2020 | Schnieders | |
| 2020/0099716 | A1* | 3/2020 | Sjouwerman | H04L 63/1416 |
| 2021/0006592 | A1 | 1/2021 | Heyman et al. | |
| 2021/0120035 | A1 | 4/2021 | Onut et al. | |

FOREIGN PATENT DOCUMENTS

| IN | 201941050222 A | * 12/2019 | |
|---|---|---|---|
| WO | WO-2011140419 A1 | * 11/2011 | G06F 17/30887 |

* cited by examiner

*Primary Examiner* — Jayesh M Jhaveri
(74) *Attorney, Agent, or Firm* — Ashwin Anand; Lei Sun (57) ABSTRACT

Methods and systems for identifying a network threat are disclosed. The methods described herein may involve receiving at least one permutation of a domain name, wherein the at least one permutation is registered with a domain name registrar. The methods described herein may further involve executing a scanning function to identify an active service on the at least one permutation registered with the domain name registrar and implementing a threat prevention procedure upon identifying an active service on the at least one permutation.

20 Claims, 6 Drawing Sheets

NETWORK THREAT PREVENTION

This Application claims priority under 35 U.S.C. § 120 and is a continuation of U.S. patent application Ser. No. 16/723,102 filed Dec. 20, 2019, titled "Domain Name Permutation," the entire contents of which are incorporated herein by reference in its entirety.

TECHNICAL FIELD

Embodiments described herein relate to methods and systems for monitoring network activity and, more particularly but not exclusively, to methods and systems for monitoring network activity to identify network threats.

BACKGROUND

Due to their prevalence in today's society, the internet and other types of networks have become hubs for criminal activity. Often times cyber-criminals or other threat actors attempt to install or otherwise deploy harmful applications on unprotected systems. Once a threat actor obtains access to a target system or device, they may perform further actions such as stealing data, escalating their privileges, or the like.

Oftentimes, malicious actors gain access to networks by registering a fake domain name that is reminiscent of a legitimate domain name. The malicious actors may then use this fake domain name to engage in targeted attacks against employees, customers, or service providers that would typically interact with the owner of the legitimate domain name.

Defenders generally maintain a reactive posture to address these fake domains, and respond only when informed of the fake domain name or when some malicious event has occurred. For example, security personnel often address phishing campaigns only after they have been launched against unsuspecting personnel. At that point, the malicious actors may have already gained access to a network and may perform additional malicious actions.

A need exists, therefore, for systems and methods that identify these types of network threats.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for identifying a network threat. The method includes receiving at least one permutation of a domain name; wherein the at least one permutation is registered with a domain name registrar; executing a scanning function to identify an active service on the at least one permutation registered with the domain name registrar; and implementing a threat prevention procedure upon identifying an active service on the at least one permutation.

In some embodiments, the method further includes receiving network activity data regarding at least one network device on a network, and analyzing the network activity data to determine whether a network device has interacted with the active service, wherein the threat prevention procedure is implemented upon determining that the network device has interacted with the active service. In some embodiments, the network device is selected from the group consisting of a honeypot device and a file transfer protocol (FTP) server. In some embodiments, the network device is an asset on a network and associated with a user.

In some embodiments, the method further includes executing a domain name resolution function to determine whether the at least one permutation resolves, wherein the threat prevention procedure is implemented upon identifying an active service on the at least one permutation resolves.

In some embodiments, the method further includes consulting a database of a list of expected domain names and filtering a permutation that matches an expected domain name.

In some embodiments, the active service is selected from the group consisting of an HTTP service, an HTTPS service, an SMTP service, a DNS service, an NTP service, and a DHCP service.

In some embodiments, implementing the threat prevention procedure includes at least one of blocking a user associated with a network device from interacting with the permutation, preventing communications from the permutation, and blacklisting the permutation.

In some embodiments, receiving the at least one permutation includes receiving a domain name of interest, executing a function to generate a plurality of permutations of the received domain name of interest, and generating a list of permutated domain names from the generated plurality of permutations.

In some embodiments, executing the scanning function further involves determining at least one of which ports are open and what services are running on the at least one permutation.

According to another aspect, embodiments relate to a system for identifying a network threat. The system includes an interface for receiving at least one permutation of a domain name, wherein the permutation is registered with a domain name registrar; and a processor executing instructions stored on memory and configured to execute a scanning function to identify an active service on the at least one permutation registered with the domain name registrar and implement a threat prevention procedure upon identifying an active service on the at least one permutation.

In some embodiments, the interface is further configured to receive network activity data regarding at least one network device on a network, and the processor is further configured to analyze the network activity data to determine whether a network device has interacted with the active service, and wherein the threat prevention procedure is implemented upon determining that the network device has interacted with the active service. In some embodiments, the network device is selected from the group consisting of a honeypot device and a file transfer protocol (FTP) server. In some embodiments, the network device is an asset on a network and associated with a user.

In some embodiments, the processor is further configured to execute a domain name resolution function to determine whether the at least one permutation resolves, wherein the threat prevention procedure is implemented upon identifying an active service on the at least one permutation resolves.

In some embodiments, the processor is further configured to consult a database of a list of expected domain names and filter a permutation that matches an expected domain name.

In some embodiments, the active service is selected from the group consisting of an HTTP service, an HTTPS service, an SMTP service, a DNS service, an NTP service, and a DHCP service.

In some embodiments, the threat prevention procedure includes at least one of blocking a user associated with a network device from interacting with the permutation, preventing communications from the permutation, and blacklisting the permutation.

In some embodiments, the interface is further configured to receive a domain name of interest, and the processor is further configured to execute a function to generate a plurality of permutations of the received domain name of interest and generate a list of permutated domain names from the generated plurality of permutations.

In some embodiments, the processor is further configured to determine at least one of which ports are open and what services are running on the at least one permutation.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

As discussed previously, malicious actors often register a domain name with a domain name registrar, wherein their registered domain name is a minor variant (for simplicity, defined herein to be a "permutation," "permuted," etc.) of a legitimate domain name. In many cases, these legitimate domain names are associated with an organization. Malicious actors will register these permutated domain names that are similar to a legitimate domain name to, for example, present fake webpages to deliver false information to unsuspecting viewers or to collect information from unsuspecting visitors.

Additionally or alternatively, malicious actors may use permutated domains as origination points for emails purporting to be from individuals with legitimate organizations. For example, a malicious actor may send to an employee an email that at first glance appears to be sent from the employee's organization (i.e., their place of employment) but is in actuality sent from a domain similar to that of the employee's organization. In these types of attacks, also known as phishing attacks or campaigns, the employee may be under the mistaken belief that the email was sent from their employer and is trustworthy. The employee would therefore have no reason not to click on a link in the email, open an attachment from the email, or the like.

As an example, a malicious actor targeting Rapid7, Inc. with a phishing campaign might register the permutated name "Raipd7" with a domain name registrar. This permutated domain name could host a webpage that mimics a login page to a Rapid7, Inc. product or company resource.

If an employee mistakenly typed "raipd7.com" into their browser, they could be presented with this fake login page. Unaware of their mistake, they may input their credentials (e.g., usernames, passwords, etc.) or other sensitive information into a prompt thinking they are dealing with a trustworthy page. In actuality, they may be providing this sensitive information to the malicious actor that registered the permutated domain name and designed the landing page to appear trustworthy.

As another example, a malicious actor may register a permutated name with a domain name registrar, and then leverage the fake domain to launch an email campaign intended to trigger particular actions. For example, a malicious actor may email an employee of the finance department of Rapid7, Inc. from wsmith@raipd7.com demanding a transfer of funds. An unsuspecting finance department employee could mistakenly believe they are dealing with a trusted employee of Rapid7, Inc. and initiate a fund transfer.

DNStwist is a tool that can enumerate permutations of a given domain. This tool can be configured to generate and return possible permutations of a domain name of interest, and can also return only permutations that have been registered with a registrar and are resolvable. However, simply knowing that a permutated domain name is registered does not reveal why the permutated name was registered or for what it has been configured.

The systems and methods of the embodiments described herein may generate or otherwise receive a list of permutations of a domain name of interest. The systems and methods described herein may then scan one or more networks to collect a volume of data regarding activities related to the permutated domains, including details regarding open ports and services on these domains.

For example, a domain name of interest may be "Rapid7." The systems and methods described herein may execute a tool such as DNStwist to generate a list of permutated domain names that appear similar to but are different from "Rapid7."

The systems and methods described herein may then implement network scanning techniques to scan these permutated domain names. Specifically, the systems and methods may scan these permutated domain names to determine, for example, which ports are open on these domain names, which services are executing, or the like. Essentially this step determines what these permutated domain names are being used for or otherwise how they are configured.

The systems and methods described herein may then search honeypot data and captured traffic data to determine whether anyone within the organization has interacted with the permutated domain(s), or if the permutated domain(s) have contacted or at least attempted to contact any legitimate assets or honeypots within the organization. Security personnel may then take any threat mitigation techniques, such as blacklisting permutated domain names from accessing an organization's network, isolating users that have interacted with the permutated domain names, or the like.

By enumerating the list of registered permutations of domain names of interest, and then scanning them for protocols and services running on these fake domains, defenders can identify cases of possible malicious activity using fake domains. Once informed, defenders can proactively address potential threats before they cause any actual harm.

Figure 1:
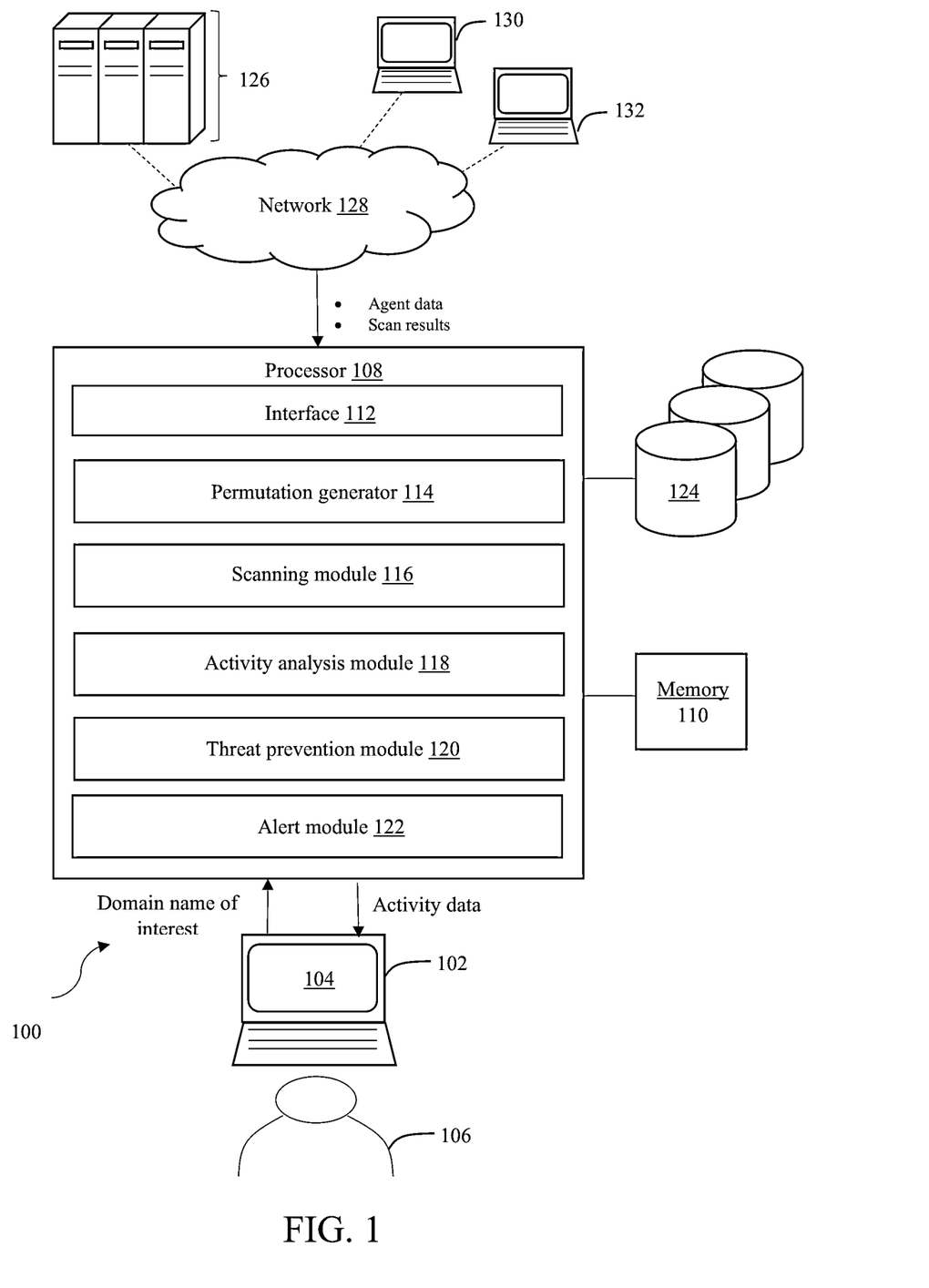
FIG. 1 illustrates a system for identifying a network threat in accordance with one embodiment.

FIG. 1 illustrates a system 100 for identifying a network threat in accordance with one embodiment. The system 100 may include one or more user devices 102 executing a user interface 104 for presentation to a user 106. The user 106 may be a network administrator of an organization or otherwise someone interested in monitoring the security of an organization's network. In this case, the user 106 may be interested in determining whether employees of an organization have interacted with a permutated domain name.

In the context of the present application, the term "organization" may refer to a corporation, a partnership, a business entity, a non-profit organization, a government entity, an administrative body, an educational institution, or any other type of entity that may be associated with a network. Similarly, the term "employee" may refer to any type of person that joins or is otherwise able to perform some activity on the organization's network. These may include personnel beyond conventional, salaried employees, but may include independent contractors, guests, auditors, or the like.

The processor 108 may execute instructions stored on memory 110 to provide various modules to accomplish the objectives of the various embodiments described herein. Specifically, the processor 108 may execute or otherwise include an interface 112, a permutation generator 114, a scanning module 116, an activity analysis module 118, a threat prevention module 120, and an alert module 122.

The interface 112 may receive a domain name of interest from the user 106. This domain name of interest may be a legitimate domain such as one that is associated with an organization. The user 106 may be a security personnel tasked with determining whether employees of the organization have interacted with permutations of the domain name of interest or vice versa.

Figure 2:
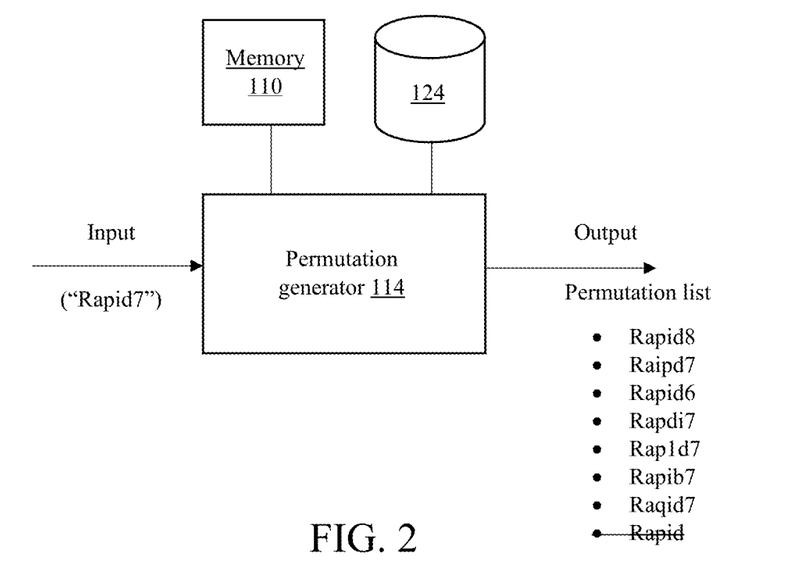
FIG. 2 illustrates the permutation generator of FIG. 1 generating a plurality of permutated domain names in accordance with one embodiment.

The domain name of interest may be communicated to the permutation generator 114, which may then generate a plurality of permutations (i.e., "permutated domain names") based on the domain name of interest. For example, FIG. 2 illustrates the permutation generator 114 of FIG. 1 receiving the legitimate domain name of interest "Rapid7" as input.

The permutation generator 114 may execute instructions stored in memory 110 to generate a plurality of permutations. Essentially, the received domain name of interest represents a string and the permutation generator 114 may run permutations by switching characters, changing numbers, or the like.

The generated list may include a plurality of names that are similar to "Rapid7" but are different to some degree. For example, a generated list of permutations may include Rapid8, Raipd7, Rapid6, Rapdi7, etc. Accordingly, these permutations are different than "Rapid7" but are similar such that an unsuspecting user may not notice the domain name is slightly different.

The memory 110 may include instructions regarding, for example, how many permutations to generate as well as how close or similar to the legitimate domain name a permutation can be in order to qualify as a permutation. Although the permutation generator 114 is shown in FIG. 2 as receiving only one legitimate domain name of interest (and generating permutations thereof), the permutation generator 114 may receive and provide permutations for multiple received domain names of interest.

The permutation generator 114 may also consult one or more databases 124 to determine if a permutation matches an expected domain name. Not all permutations may be of concern for the user 106, such as permutations that are also registered by the organization. For example, in this case "Rapid" is a permutation that would not be of interest to the user 106 or the organization as another, separate but legitimate organization owns the domain "Rapid." Accordingly, the permutation generator 114 may filter these expected permutations as they would likely not be relevant.

The permutation generator 114 may also execute one or more of a plurality of machine learning procedures during the permutation generation process. This may help generate an appropriate number of domain names that are relevant for the organization's analysis, but not so encompassing such that irrelevant permutations are returned.

The permutation generator 114 may also confirm that the generated permutations are registered with a registrar. For example, the permutation generator 114 may query registrars to determine if the generated permutations are registered therewith.

Additionally, the processor 108 may confirm that the permutated domains resolve. That is, that there are actually DNS records that are associated with the permutated domains. This ensures that permutations that are merely registered but not resolving are not returned. For example, a threat actor can register a domain name with a registrar, but ultimately not set up any records or otherwise perform any further activity in connection with the registered domain. These non-resolving domains may not be of interest to the user 106, as these domains likely would not be interacting with employees of the organization.

The systems and methods of the embodiments herein may generate this list, or they may receive this type of list from another entity. For example, and as discussed previously, DNStwist is a publicly available tool that may be used to generate and provide the permutations.

Figure 3A:
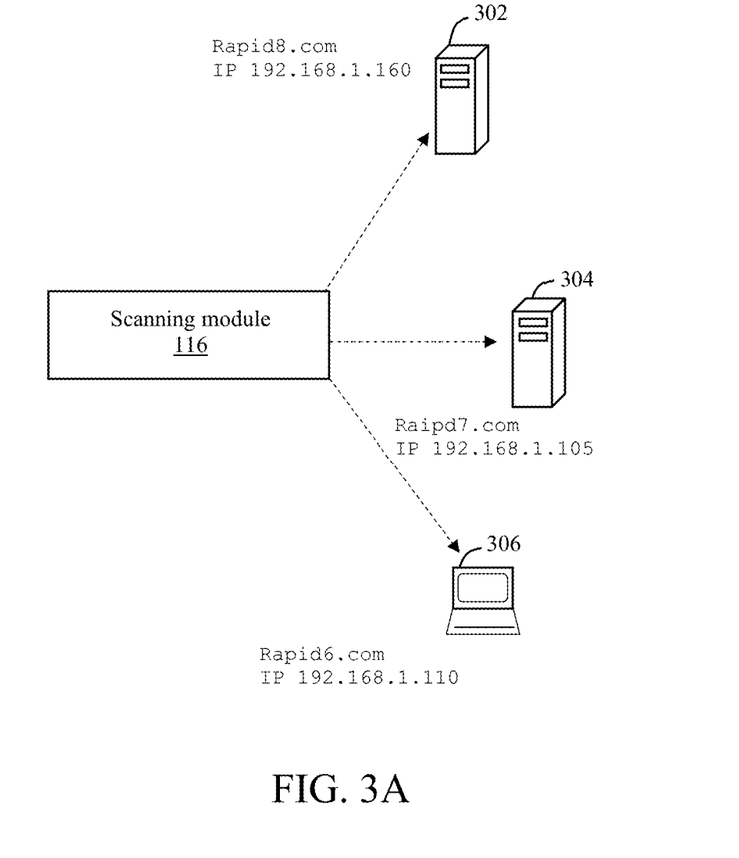
FIGS. 3A-C illustrate the scanning module of FIG. 1 scanning a plurality of permutated domain names in accordance with one embodiment.

FIG. 3A illustrates the scanning module 116 of FIG. 1 performing scans of permutated domains 302, 304, and 306. Domain 302 corresponds to Rapid8.com, domain 304 corresponds to Raipd7.com, and domain 306 corresponds to Rapid6.com. Each of these domain names are associated with an IP address.

Figure 3B:
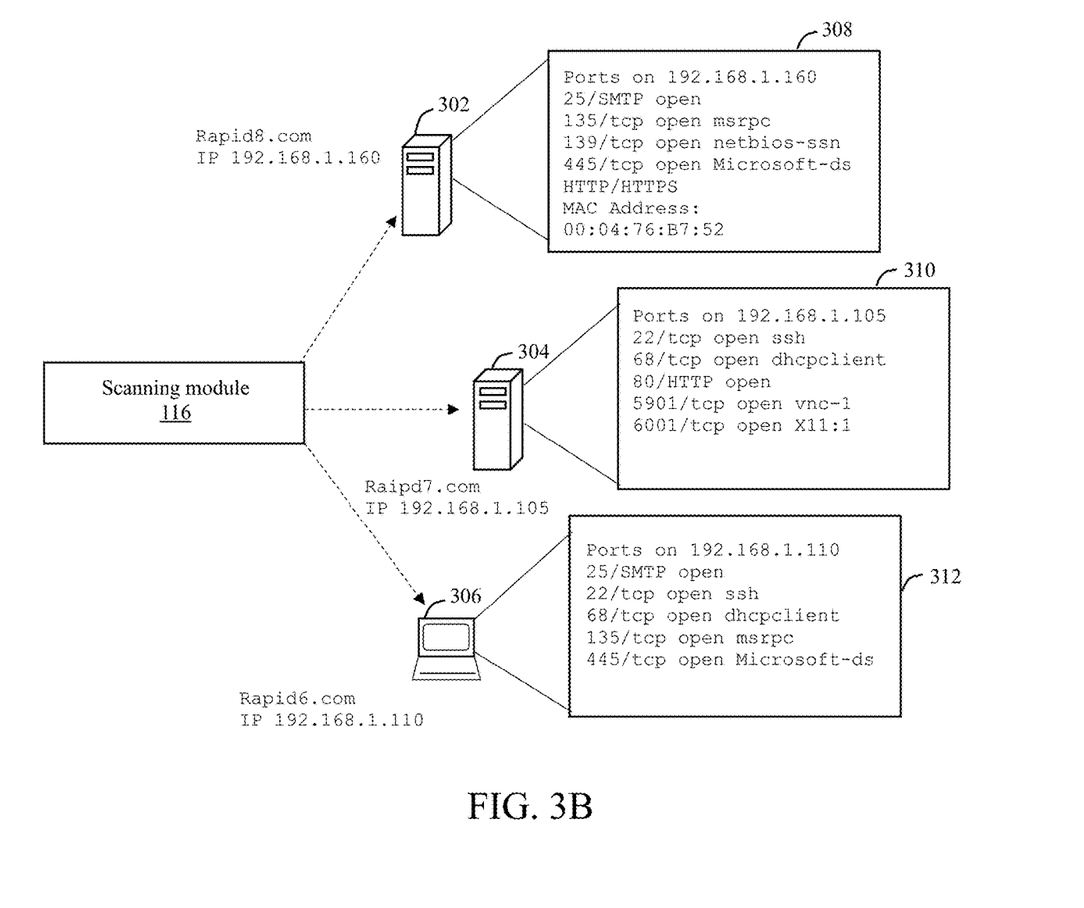

As seen in FIG. 3B, the scanning module 116 may return results 308 corresponding to domain 302, results 310 corresponding to domain 304, and results 312 corresponding to domain 306. These results 308-12 may provide insight regarding which ports are open on the domains and which processes or services are executing thereon. The ports that are open and the types of services executing on a permutated domain may provide valuable information regarding how the permutated domains are being used.

Figure 3C:
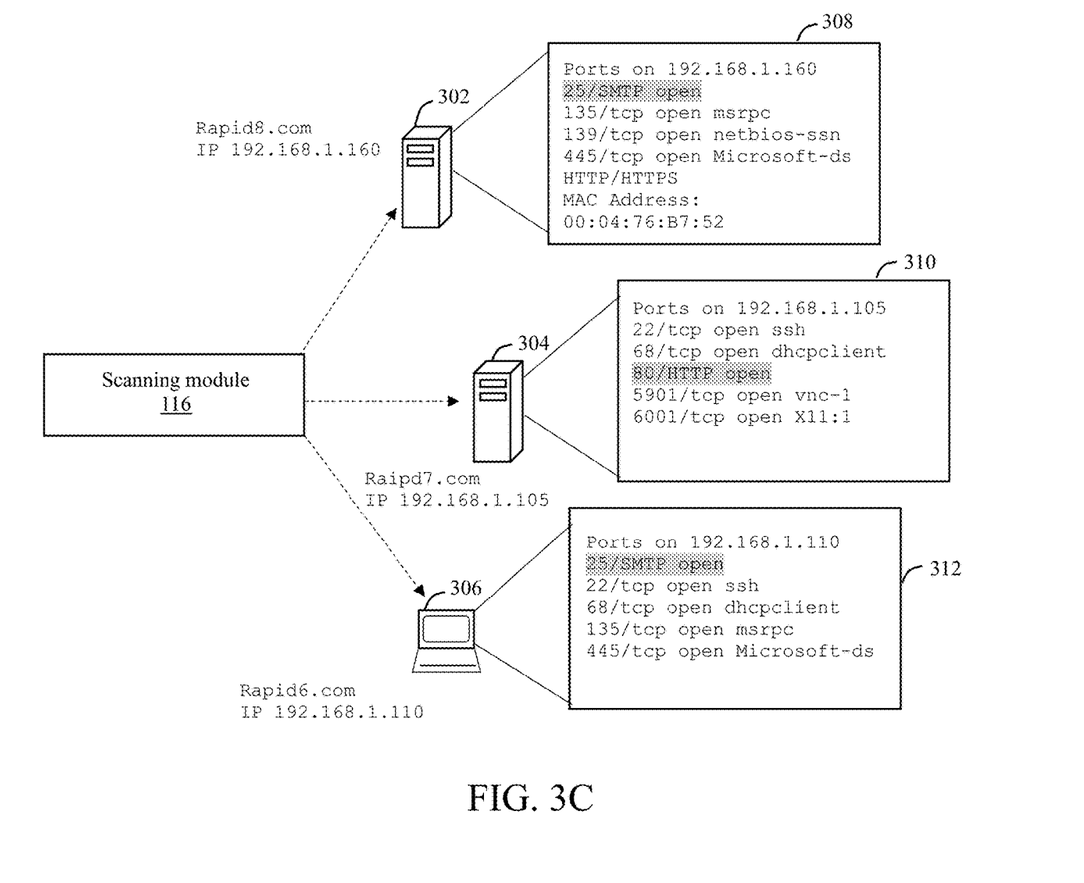

For example, and as seen in FIG. 3C, results 308 and 312 indicate that domains 302 and 306, respectively, each have port 25 open. Port 25 is designated for the Simple Mail Transfer Protocol (SMTP), which is used for routing emails between network locations. Accordingly, the results 308 and 312 may indicate that the associated permutated domains are likely being used for communicating emails. This may concern the user 106 or the organization, as these permutated domains may be sending out phishing emails to the organization's employees.

As another example, the results 310 indicate that domain 304 has port 80 open. Port 80 is designated for the Hypertext Transfer Protocol (HTTP), which defines how messages or requests are formatted between web browsers and web servers. Accordingly, the results 310 may indicate that the associated domain 304 is at least likely being used for serving one or more web pages. This may be of concern to the user 106 or the organization, as this permutated domain 304 may be hosting a fake web page that appears to be associated with the organization. As discussed previously, an unsuspecting employee may mistakenly visit this web page and may provide sensitive information such as credentials.

It follows that a user 106 would then want to know if anyone has interacted with these domains, as well as the nature of those interactions. For example, the user 106 of the organization may want to know which employees have visited a domain such as the domain 304, or which employees have received emails from domains 302 and 306.

The activity analysis module 118 may therefore monitor and capture traffic data involving employee devices 130 and 132 or other types of network devices or file transfer protocol (FTP) servers to see if anyone from within the organization has interacted with these domains. Similarly, the activity analysis module 118 may monitor traffic data to detect if these domains have reached out to any legitimate assets (or virtual security appliances such as honeypots) within or otherwise associated with the organization. The activity analysis module 118 may be configured in a variety of ways as long as it can gather data indicative of interactions or attempted interactions involving the permutated domains and employees or assets associated with an organization.

In some embodiments, the organization may set up virtual security appliances such as honeypots to monitor behavior on the organization's network(s). These virtual security appliances may appear similar to other assets or devices on a network, but may actually serve no real or legitimate purpose other than to gather data regarding threat actor behavior.

For example, threat actors may be under the mistaken belief that a virtual security appliance is associated with an employee who may have access to valuable information. The threat actors may be tempted to interact with these appliances, thinking they may be able to gain this information. In actuality, however, these appliances are not associated with an employee or real system and do not possess any valuable information. As the organization knows that these appliances are not associated with any real person or system, the organization can conclude that any interactions with the appliance are conducted by a threat actor.

Upon the activity analysis module 118 determining that an employee or some network device has interacted with one of these permutated domains, the threat prevention module 120 may autonomously implement one or more threat prevention, mitigation, or remediation procedures. The type of procedure implemented may vary and may depend on the nature of the detected interaction with a permutated domain.

For example, if an employee had interacted with domain 304 of FIG. 3 (which has port 80 for HTTP open), the interaction may have involved the employee providing their credentials to a fake login page. A threat actor would have possession of the employee's credentials, and could use these credentials to subsequently log in to the organization's network.

In this case, the threat prevention module 120 may first block the employee's credentials from subsequently being accepted on the organization's network. This would essentially render the threat actor's possession of the maliciously-obtained credentials meaningless. The threat prevention module 120 may also instruct the employee to update their credentials (e.g., username, password, security questions, or the like).

As another example, if an employee had interacted with the domain 302 of FIG. 3 (which has port 25 for SMTP open), the interaction may have involved the employee receiving an email, and then activating a link in the email or opening an attachment in the email. Unbeknownst to the employee, these actions may have executed harmful software on the employee's network device. This software may allow the threat actor to have access to the employee's device, view files thereon, escalate their privileges or the like.

In this case, the threat prevention module 120 may quarantine the employee's device on the network to prevent the threat actor from gaining access to or communicating with other locations on the network. The threat prevention module 120 may similarly execute any appropriate virus scans or the like to detect and remove any malware. These are only examples of actions that may be performed by the threat prevention module 120, and other actions may be implemented without departing from the scope of the embodiments described herein.

Referring back to FIG. 1, the alert module 122 may additionally or alternatively issue an alert to the user 106 informing the user 106 of the detected activity. The alert may be a visual-based alert, a text-based alert, an audio-based alert, a haptic-based alert, or some combination thereof.

The user interface 104 may also present to the user 106 data that caused the alarm. This may include the permutated domain, the nature of the interaction between an employee and the permutated domain, or the like. The user 106 may then take any further remedial action(s) as well.

Figure 4:
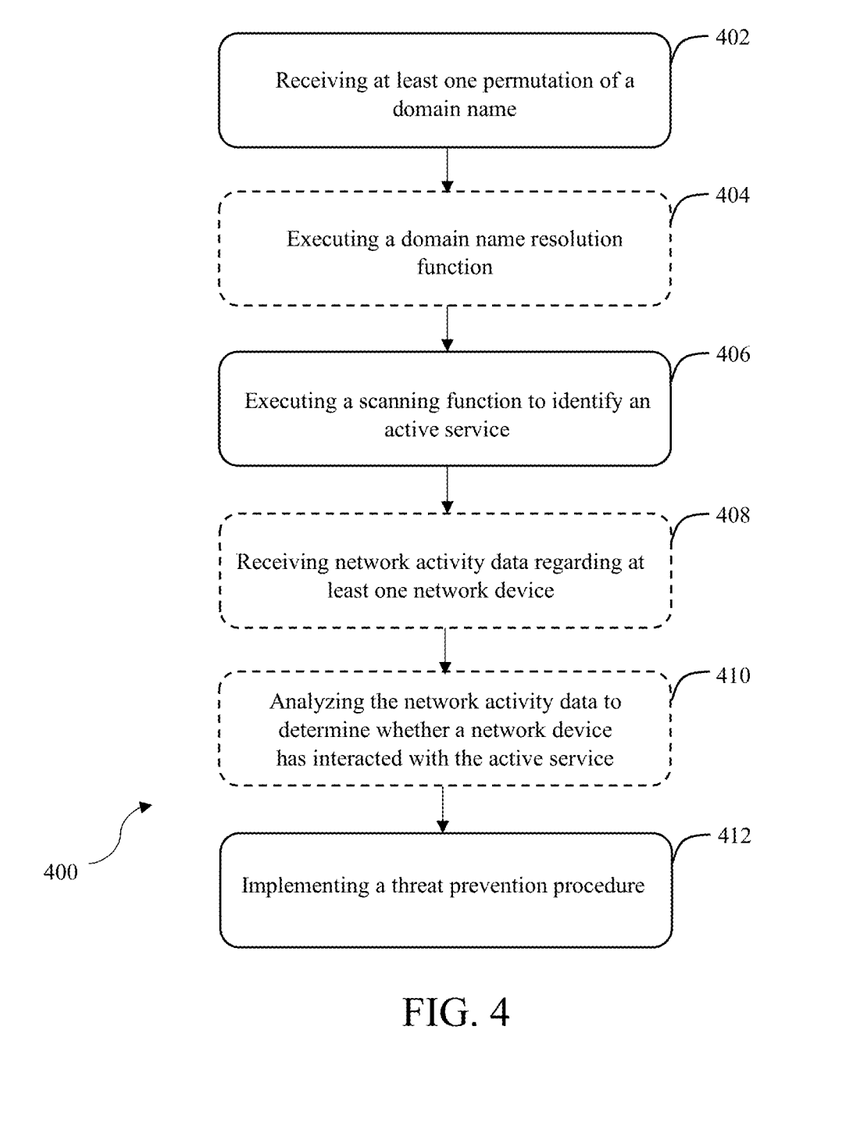
FIG. 4 depicts a flowchart of a method for identifying a network threat in accordance with one embodiment.

FIG. 4 depicts a flowchart of a method 400 for identifying a network threat in accordance with one embodiment. The system 100 of FIG. 1 or components thereof may perform the steps of method 400.

Step 402 involves receiving at least one permutation of a domain name, wherein the at least one permutation is registered with a domain name registrar. In accordance with step 402, the domain name may be the domain name of a legitimate organization or some other entity. The at least one received permutation, on the other hand, may be unassociated with the organization but instead is intended to appear associated with the organization. As discussed previously these permutations are generally intended to fool unsuspecting people into thinking the permutation is legitimate. For the purposes of method 400, a domain name may be "Rapid7" and a received permutation may be "Raipd7".

Step 404 involves executing a domain name resolution function to determine whether the at least one permutation resolves. This optional step ensures that a permutated domain name is not only registered but actually resolves (e.g., has an associated DNS entry). This step may therefore help preserve time and computing resources, as the systems and methods described herein would likely not need to examine non-resolving domain names further, as there would be no risk of them interacting with employees.

Step 406 involves executing a scanning function to identify an active service on the at least one permutation registered with the domain name registrar. This step may help determine how the permutated domain is being used. The scanning module 116 of FIG. 1 may perform this step, which may involve port scanning, ping sweeping, or the like. For example, the scanning function may identify services such as HTTP services, HTTPS services, SMTP services, DNS services, NTP services, and DHCP services.

Step 408 involves receiving network activity data regarding at least one network device on a network. This network activity data may be gathered by any suitable network monitoring device or tool.

Step 410 involves analyzing the network activity data to determine whether a network device has interacted with the active service. As discussed previously, the systems and methods described herein may then analyze network activity data to determine whether and to what degree an employee on an organization's network has interacted with a permutated domain or vice versa. For example, an employee may have opened a link or an attachment that was sent from a permutated domain, or may have visited a website hosted by the permutated domain.

Step 410 involves implementing a threat prevention procedure upon identifying an active service on the at least one permutation. Certain activity detected in step 408 may warrant one or more remedial, prevention, or mitigation procedures. These may include, but are not limited to, blocking a user associated with a network device from interacting with the permutation, preventing communications from the permutation, and blacklisting the permutation.

What is claimed is:

1. A method, comprising:
   receiving a permutation of a domain name;
   executing a domain name resolution function to identify a network address associated with the permutation of a domain name;
   executing a scanning function to identify an active service associated with the network address;
   receiving network activity data associated with a network device;
   analyzing the network activity data to determine that a user associated with the network device has caused an interaction between the active service and the network device;
   in response to the determination of the interaction, presenting a visual alert to the user that caused the interaction via a user interface indicating the interaction and the permutation of the domain name; and
   in response to user input received via the user interface, executing a threat prevention procedure on the network device.

2. The method of claim 1, wherein
   the permutation of the domain name is registered with a domain name registrar.

3. The method of claim 2, wherein the scanning function:
   identifies the active service on the permutation of the domain
      name registered with the domain name registrar,
   determines an open port associated with the permutation of
      the domain name, and
   identifies the active service on the open port associated with
      the permutation of the domain name.

4. The method of claim 1, wherein executing the threat prevention procedure comprises:
   removing malware from the network device;
   blocking a user credential associated with the network device; or
   quarantining the network device.

5. The method of claim 1, wherein
   the network device is a user device.

6. The method of claim 1, further comprising:
   capturing honeypot data using a honeypot device associated with a network and implemented as a virtual security appliance; and
   searching the honeypot data to determine that the active service on
      the permutation of the domain name has attempted to
         contact another honeypot device in the network.

7. The method of claim 1, further comprising:
   executing a domain name resolution function to determine whether
      the permutation of the domain name resolves; and
   executing the threat prevention procedure upon determining that the active service on the permutation has resolved.

8. A non-transitory computer readable storage medium comprising program instructions executable to:
   receive a permutation of a domain name;
   execute a domain name resolution function to identify a network address associated with the permutation of a domain name;
   execute a scanning function to identify an active service associated with the network address;
   receive network activity data associated with a network device;
   analyze the network activity data to determine that a user associated with the network device has caused an interaction between the active service and the network device;
   in response to the determination of the interaction, present a visual alert to the user that caused the interaction via a user interface indicating the interaction and the permutation of the domain name; and
   in response to user input received via the user interface, execute a threat prevention procedure on the network device.

9. The non-transitory computer readable storage medium of claim 8, wherein
   the permutation of the domain name is registered with a domain name registrar.

10. The non-transitory computer readable storage medium of claim 9, wherein the scanning function:
    identifies the active service on the permutation of the domain
       name registered with the domain name registrar,
    determines an open port associated with the permutation of
       the domain name, and
    identifies the active service on the open port associated with
       the permutation of the domain name.

11. The non-transitory computer readable storage medium of claim 8, wherein the threat prevention procedure comprises:
    removing malware from the network device;
    blocking a user credential associated with the network device; or
    quarantining the network device.

12. The non-transitory computer readable storage medium of claim 8, wherein
    the network device is a user device.

13. The non-transitory computer readable storage medium of claim 8, wherein the program instructions are executable to:
    capture honeypot data using a honeypot device associated with a network and implemented as a virtual security appliance; and
    search the honeypot data to determine that the active service on the permutation of the domain name has attempted to contact another honeypot device in the network.

14. The non-transitory computer readable storage medium of claim 8, wherein the program instructions are executable to:
    execute a domain name resolution function to determine whether
       the permutation of the domain name resolves; and
    execute the threat prevention procedure upon determining that the active service on the permutation has resolved.

15. A system comprising:
one or more processors; and
a memory coupled to the one or more processors, wherein the memory stores program instructions executable by the one or more processors to:
receive a permutation of a domain name;
execute a domain name resolution function to identify a network address associated with the permutation of a domain name;
execute a scanning function to identify an active service associated with the network address;
receive network activity data associated with a network device;
analyze the network activity data to determine that a user associated with the network device has caused an interaction between the active service and the network device;
in response to the determination of the interaction, present a visual alert to the user that caused the interaction via a user interface indicating the interaction and the permutation of the domain name; and
in response to user input received via the user interface, execute a threat prevention procedure on the network device.

16. The system of claim 15, wherein
the permutation of the domain name is registered with a domain name registrar.

17. The system of claim 16, wherein the scanning function:
identifies the active service on the permutation of the domain name registered with the domain name registrar,
determines an open port associated with the permutation of
the domain name, and
identifies the active service on the open port associated with
the permutation of the domain name.

18. The system of claim 15, wherein the threat prevention procedure comprises:
removing malware from the network device;
blocking a user credential associated with the network device; or
quarantining the network device.

19. The system of claim 15, wherein the program instructions are executable to:
capture honeypot data using a honeypot device associated with a network and implemented as a virtual security appliance; and
search the honeypot data to determine that the active service on
the permutation of the domain name has attempted to contact another honeypot device in the network.

20. The system of claim 15, wherein the program instructions are executable to:
execute a domain name resolution function to determine whether
the permutation of the domain name resolves; and
execute the threat prevention procedure upon determining that the active service on the permutation has resolved.

* * * * *